United States Patent
Katsuhara

(10) Patent No.: US 8,320,015 B2
(45) Date of Patent: Nov. 27, 2012

(54) MAINTENANCE PROCESSING CONTROL FOR IMAGE FORMING JOB

(75) Inventor: Kenji Katsuhara, Chuo-ku (JP)

(73) Assignee: Kyocera Document Solutions Inc., Osaka (JP)

( * ) Notice: Subject to any disclaimer, the term of this patent is extended or adjusted under 35 U.S.C. 154(b) by 1139 days.

(21) Appl. No.: 12/072,037

(22) Filed: Feb. 22, 2008

(65) Prior Publication Data

US 2008/0204780 A1    Aug. 28, 2008

(30) Foreign Application Priority Data

Feb. 27, 2007  (JP) ................. 2007-046439
Feb. 27, 2007  (JP) ................. 2007-046440
Mar. 7, 2007   (JP) ................. 2007-056715

(51) Int. Cl.
*H04N 1/50* (2006.01)

(52) U.S. Cl. .................. 358/1.9; 358/406; 358/504

(58) Field of Classification Search .............. 358/1.1, 358/1.9, 406, 504, 1.14, 500, 501, 518
See application file for complete search history.

(56) References Cited

U.S. PATENT DOCUMENTS

| 5,950,036 | A   |   | 9/1999  | Konishi  |          |
|-----------|-----|---|---------|----------|----------|
| 6,280,105 | B1  | * | 8/2001  | Iida     | 400/74   |
| 6,452,692 | B1  | * | 9/2002  | Yacoub   | 358/1.15 |
| 7,079,272 | B2  | * | 7/2006  | Hatayama | 358/1.15 |
| 7,301,651 | B2  | * | 11/2007 | Noda     | 358/1.13 |

FOREIGN PATENT DOCUMENTS

| JP | 2005-049547 | 2/2005 |
| JP | 2006-130779 | 5/2006 |
| JP | 2006-157804 | 6/2006 |
| JP | 2007-199428 | 8/2007 |

* cited by examiner

*Primary Examiner* — Thomas D Lee
(74) *Attorney, Agent, or Firm* — Jordan and Hamburg LLP

(57) ABSTRACT

According to an image forming apparatus of the present invention, when a user with the intention of having a processing completed in a short time inputs execution of an image forming job involving the intention, this operation information is acquired by an operation information acquisition section. In response to that, an invalidation determining section determines to invalidate processing for maintenance, based on the operation information. Responding to that, an invalidation control section invalidates the processing for maintenance on image forming during execution of the image forming job regardless of predetermined rules. By this means, the processing for maintenance on image forming cannot be executed during the image forming job in the case of a user with the intention of having a processing completed in a short time.

9 Claims, 9 Drawing Sheets

MAINTENANCE PROCESSING CONTROL FOR IMAGE FORMING JOB

BACKGROUND OF THE INVENTION

1. Technical Field

The present invention relates to an image forming apparatus, a printer driver, a program and a recording medium which can satisfy both conflicting requests from a user that a processing time for image forming is short and that an image with high quality is obtained.

2. Background Art

It has been conventionally known that printout characteristics such as density are changed due to a change in environments such as temperature and humidity in a setting location of an image forming apparatus including a copier, a printer, a facsimile machine or a combination of the machines and a change over time in the status of each component of the apparatus. In a color copier, for example, the amount of toner adhered to recording paper is changed when the temperature, humidity or the like in an atmosphere of its setting location is changed, and thus its output characteristics deviate from the characteristics as they should be intrinsically. In addition, the temperature in each component of the apparatus is raised when image forming processing is performed in succession for a long time, whereby a deviation can be also caused in the output characteristics.

In order to compensate for such a change in output characteristics involved in a disturbance, an adjustment (hereinafter referred to as a calibration) of the output characteristics is generally made in the image forming apparatus. It is known as a calibration, for example, to form a patch image for adjusting the output characteristics on an intermediate transfer member, read its toner density, feed back its result and adjust the developing bias value of a developing machine.

The calibration plays an important role in maintaining image quality above a certain level in the apparatus. On the other hand, processing of the calibration takes a relatively long time, for example, several tens of seconds, which causes a disadvantage that the apparatus is not available during that time.

As an approach to eliminate the disadvantage, Japanese Published Unexamined Patent Application No. 2006-130779 discloses art wherein a calibration is not conducted until the cumulative number of copies exceeds a predetermined value when a copy job is performed in succession, thereby attempting to suppress sudden performance of the calibration during the job or between each job and interruption of copying by the calibration as much as possible, for example.

However, the aforementioned prior art uniformly processes whether to perform the calibration in a case where a copy job is carried out in succession, based on whether the cumulative number of copies exceeds a predetermined value in the job. Consequently, conflicting requests from a user that a processing time for image forming is short and that an image with high quality is obtained cannot both be satisfied.

SUMMARY OF THE INVENTION

Accordingly, it is an object of the present invention to provide an image forming apparatus capable of satisfying both conflicting requests from a user that a processing time for image forming is short and that an image with high quality is obtained.

It is another object of the present invention to provide a printer driver, a program and a recording medium capable of satisfying both conflicting requests from a user that a processing time for image forming is short and that an image with high quality is obtained.

In order to achieve the aforementioned objects, an image forming apparatus according to the present invention, configured to execute processing for maintenance on image forming, based on predetermined rules, includes an operation information acquisition section acquiring operation information related to execution of an image forming job, an invalidation determining section making a determination on whether the maintenance processing needs to be invalidated, based on the operation information acquired by the operation information acquisition section and an invalidation control section taking control of invalidating the maintenance processing during execution of the image forming job regardless of the predetermined rules, when a determination that the maintenance processing needs to be invalidated is made, as a result of the determination in the invalidation determining section.

The present invention can adopt a configuration in which the invalidation determining section determines to invalidate the maintenance processing when the operation information acquisition section acquires operation information that an image forming job involving an intention of having a processing completed in a short time needs to be executed.

Furthermore, the present invention can adopt a configuration in which the maintenance processing can be processing of a calibration for maintaining quality of image forming.

Still furthermore, the present invention may adopt a configuration in which an operation key section with a plurality of operation keys for accepting an operation input by a user, the operation input being related to execution of an image forming job, is further provided, and the operation information related to the execution of the image forming job involving the intention of having a processing completed in a short time may be obtained by simultaneously operating more than one key in combination among the plurality of the operation keys.

Moreover, the present invention can adopt a configuration in which an operation key section with a plurality of operation keys for accepting an operation input by a user, the operation input being related to execution of an image forming job, is further provided, and the operation information related to the execution of the image forming job involving the intention of having a processing completed in a short time can be obtained by operating an independent dedicated key among the plurality of the operation keys.

The present invention may adopt a configuration in which the operation key section is composed of both or either one of groups of keys of hardware resources and software resources.

Alternatively, the image forming apparatus according to the present invention can adopt a configuration in which an operation key section with a plurality of operation keys for accepting an operation input by a user, the operation input being related to execution of an image forming job, is further provided, and the invalidation determining section determines to invalidate the maintenance processing when the operation information acquisition section acquires operation information that the operation key is input multiple times within a predetermined time.

Furthermore, the present invention can adopt a configuration in which the maintenance processing is processing related to a calibration for maintaining quality of image forming.

Still furthermore, the present invention may adopt a configuration in which the operation key is a start key operated at the time of an input instruction for execution of an image forming job.

Moreover, the present invention can adopt a configuration in which the invalidation determining section determines to invalidate the maintenance processing when the operation key is input during execution of the image forming job or maintenance processing.

Additionally, the present invention may adopt a configuration in which the operation key section is composed of both or either one of groups of keys of hardware resources and software resources.

On the other hand, a printer driver according to the present invention is installed in an information processor provided with a display in order to control an operation of a printer configured to execute processing for maintenance on printing, based on predetermined rules, includes an operation information accepting section accepting an input operation related to execution of a print job and an invalidation command transfer section transferring to the printer a command to invalidate the maintenance processing during execution of a print job involving an intention of having a processing completed in a short time, when the operation information accepting section accepts operation information related to the execution of the print job.

The present invention can adopt a configuration in which the processing for maintenance on printing is processing related to a calibration for maintaining print quality.

Furthermore, the present invention can adopt a configuration in which the operation information related to the execution of the print job involving the intention of having a processing completed in a short time is accepted by clicking multiple times a print button provided on a dialogue related to execution of a print job and displayed on a display screen of the display.

Still furthermore, the present invention may adopt a configuration in which the operation information related to the execution of the print job involving the intention of having a processing completed in a short time is accepted by clicking a dedicated correction invalidation print button provided on a dialogue related to execution of a print job and displayed on a display screen of the display.

Moreover, a program according to the present invention only needs to be configured as a program for realizing the function of the printer driver according to the present invention in the information processor.

A recording medium according to the present invention only needs to be configured as a computer-readable recording medium storing the program according to the present invention.

<Operation and Effects of the Invention>

In the image forming apparatus according to the present invention, when a user with the intention of having a processing completed in a short time performs an input operation related to execution of an image forming job involving the intention, this operation information is acquired by the operation information acquisition section, for example. In response to that, the invalidation determining section determines to invalidate the maintenance processing, based on the operation information, whereupon the invalidation control section invalidates the processing for maintenance on image forming during execution of the image forming job regardless of predetermined rules. By this means, the processing for maintenance on image forming cannot be executed during the image forming job in the case of a user with the intention of having a processing completed in a short time. Consequently, a benefit in line with the user's intention of having a processing completed in a short time can be gained. On the other hand, the processing for maintenance on image forming is executed during the image forming job, based on predetermined rules, with regard to a user having no such intention. Therefore, a benefit of obtaining an image with high quality to which maintenance on image forming is performed as appropriate can be gained. As a result, conflicting requests from a user that a processing time for image forming is short and that an image with high quality is obtained can both be satisfied.

On the other hand, in the printer driver according to the present invention, when a user with the intention of having a processing completed in a short time performs an input operation related to execution of a print job involving the intention, this operation information is accepted by the operation information accepting section. In response to that, the invalidation command transfer section transfers to the printer a command to invalidate the processing for maintenance on printing during execution of the print job regardless of predetermined rules, whereupon the maintenance processing is invalidated during execution of the print job. Therefore, the processing for maintenance on printing cannot be executed during the print job in the case of a user with the intention of having a processing completed in a short time. Accordingly, a benefit in line with the user's intention of having a processing completed in a short time can be gained. On the other hand, the processing for maintenance on printing is executed during the print job according to predetermined rules with regard to a user having no such intention. Therefore, a benefit of obtaining an image with high quality to which maintenance on printing is performed as appropriate can be gained. As a result, conflicting requests from a user that a processing time for printing is short and that an image with high quality is obtained can both be satisfied.

The program according to the present invention is configured as a program for realizing the function of the printer driver according to the present invention in the information processor. Consequently, an information processor capable of satisfying both conflicting requests from a user that a processing time for printing is short and that an image with high quality is obtained can be embodied by installing the program according to the present invention in the information processor.

The recording medium according to the present invention is configured as a computer-readable recording medium storing the program according to the present invention, which contributes greatly to the spread of a program exhibiting a practical application with superior functions of satisfying both conflicting requests from a user that a processing time for printing is short and that an image with high quality is obtained.

DETAILED DESCRIPTION OF THE INVENTION

Figure 1:
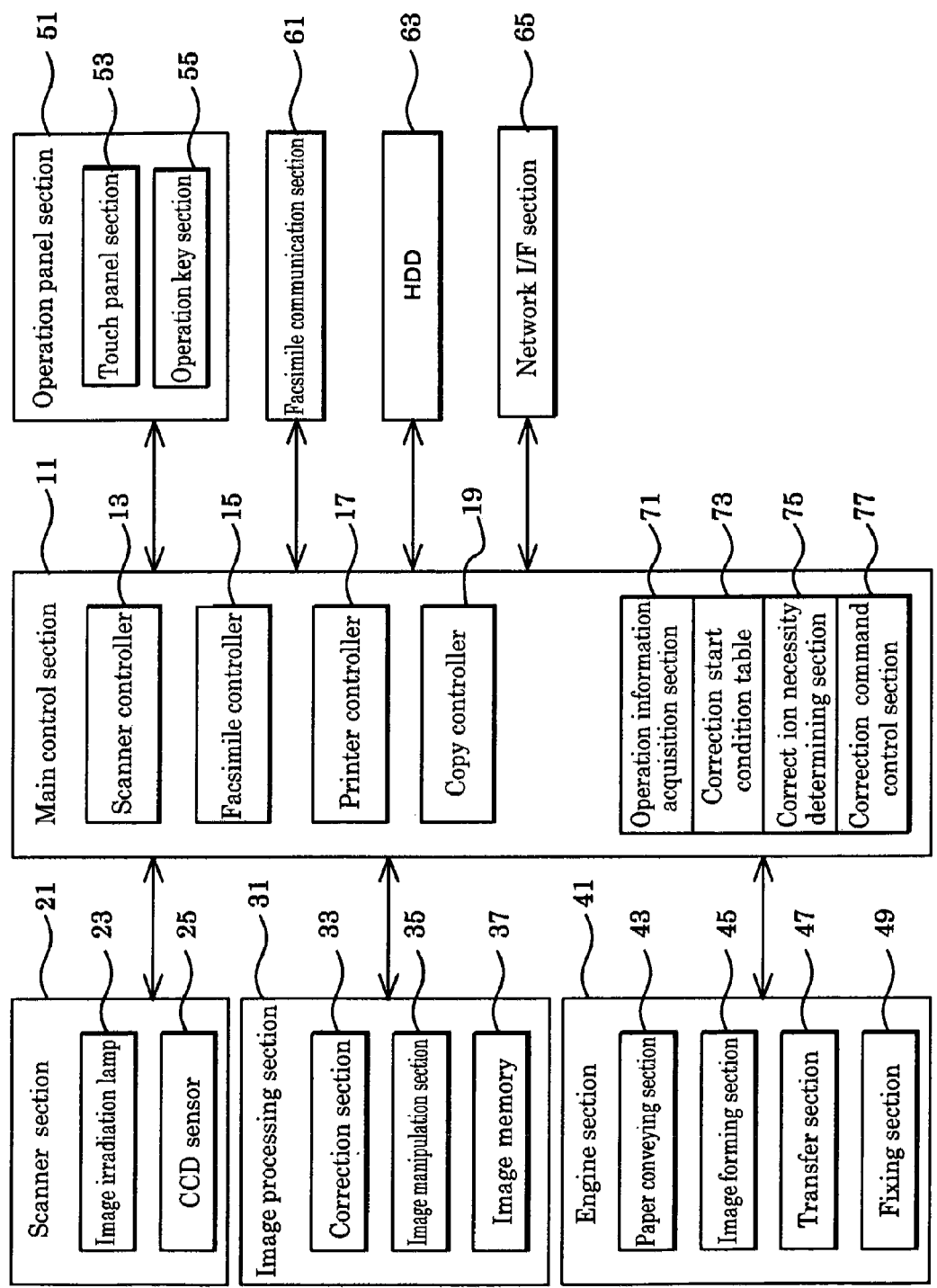
FIG. 1 is a functional block diagram showing a general configuration of image forming apparatuses according to a first and a second embodiment of the present invention.

Hereinafter, image forming apparatuses according to a first and a second embodiment of the present invention, a printer driver, a program and a recording medium are described in detail with reference to the drawings. Configurations of functional sections are nearly common between the image forming apparatuses of the first and second embodiments.

Accordingly, the functional sections in common between the image forming apparatuses of the first and second embodiments are denoted by the same symbols. An explanation will be given focusing on differences between them while repeated explanation is omitted.

[Image Forming Apparatuses of a First and a Second Embodiments of the Present Invention]

(General Configuration of the Image Forming Apparatuses of the First and Second Embodiments of the Present Invention)

The image forming apparatuses according to the first and second embodiments of the present invention are, for example, a digital color copier. In order to compensate for a change in output characteristics involved in a disturbance including temperature, humidity or the like in an atmosphere of a setting location of the apparatus, the apparatus has a function of performing a calibration including a correction of color drift when a predetermined correction start condition (corresponding to 'predetermined rules' in claims) as will be described later is satisfied.

Additionally, at least one of the functions of a printout, a facsimile transmission, a mail transmission and a data transmission is available in the image forming apparatus. The apparatus is controlled by a main control section 11 composed of a microcomputer and dedicated hardware circuitry. As input/output devices connected to the main control section 11 and taking charge of various functions, the image forming apparatus includes a scanner section 21, an image processing section 31, an engine section 41, an operation panel section 51, a facsimile communication section 61, a hard disk drive (HDD) 63 and a network interface (I/F) section 65.

The main control section 11 houses a scanner controller 13 controlling an operation for achieving a scanner function, a facsimile controller 15 controlling an operation for achieving a facsimile function, a printer controller 17 controlling an operation for achieving a printer function and a copy controller 19 controlling an operation for achieving a copy function.

The main control section 11 has overall control for an operation of the entire apparatus.

The scanner section 21 includes an image irradiation lamp 23 and a charge coupled device (CCD) sensor 25 constituting a scanner (not shown). The image irradiation lamp 23 irradiates a document and the CCD sensor 25 receives its reflected light, whereby the scanner section 21 reads out an image from the document and outputs image data corresponding to the read-out image to the image processing section 31.

The image processing section 31 includes a correction section 33, an image manipulation section 35 and an image memory 37. The image processing section 31 processes the image data having been read by the scanner section 21, with use of the correction section 33 and the image manipulation section 35 according to need, and stores the processed image data on the image memory 37 or outputs the processed image data to the engine section 41 and the facsimile communication section 61. The correction section 33 makes a predetermined correction such as a level correction, a Y correction and the like to the image data which has been read by the scanner section 21. The image manipulation section 35 executes a variety of manipulating processings such as compression or expansion and scaling of image data.

The engine section 41 includes a paper conveying section 43 composed of a paper feeding cassette, a paper feeding roller, etc., which are not shown, an image forming section 45 composed of a photosensitive drum, an exposure system, a development system, etc., which are not shown, a transfer section 47 composed of a transfer roller, etc., (not shown) and a fixing section 49 composed of a fixing roller, etc., (not shown). The engine section 41 prints out an image on a sheet of paper by means of image data which has been read by the scanner section 21, image data which has been transmitted from a client personal computer (PC) by a local area network (LAN) via the network I/F section 65 and image data of facsimile data which has been received from an external facsimile machine by the facsimile communication section 61. More specifically, the paper conveying section 43 conveys a sheet of paper to the image forming section 45, which forms a toner image corresponding to the foregoing image data. The transfer section 47 transfers the toner image to the sheet of paper. The fixing section 49 fixes the toner image on the sheet of paper to form an image.

Figure 2:
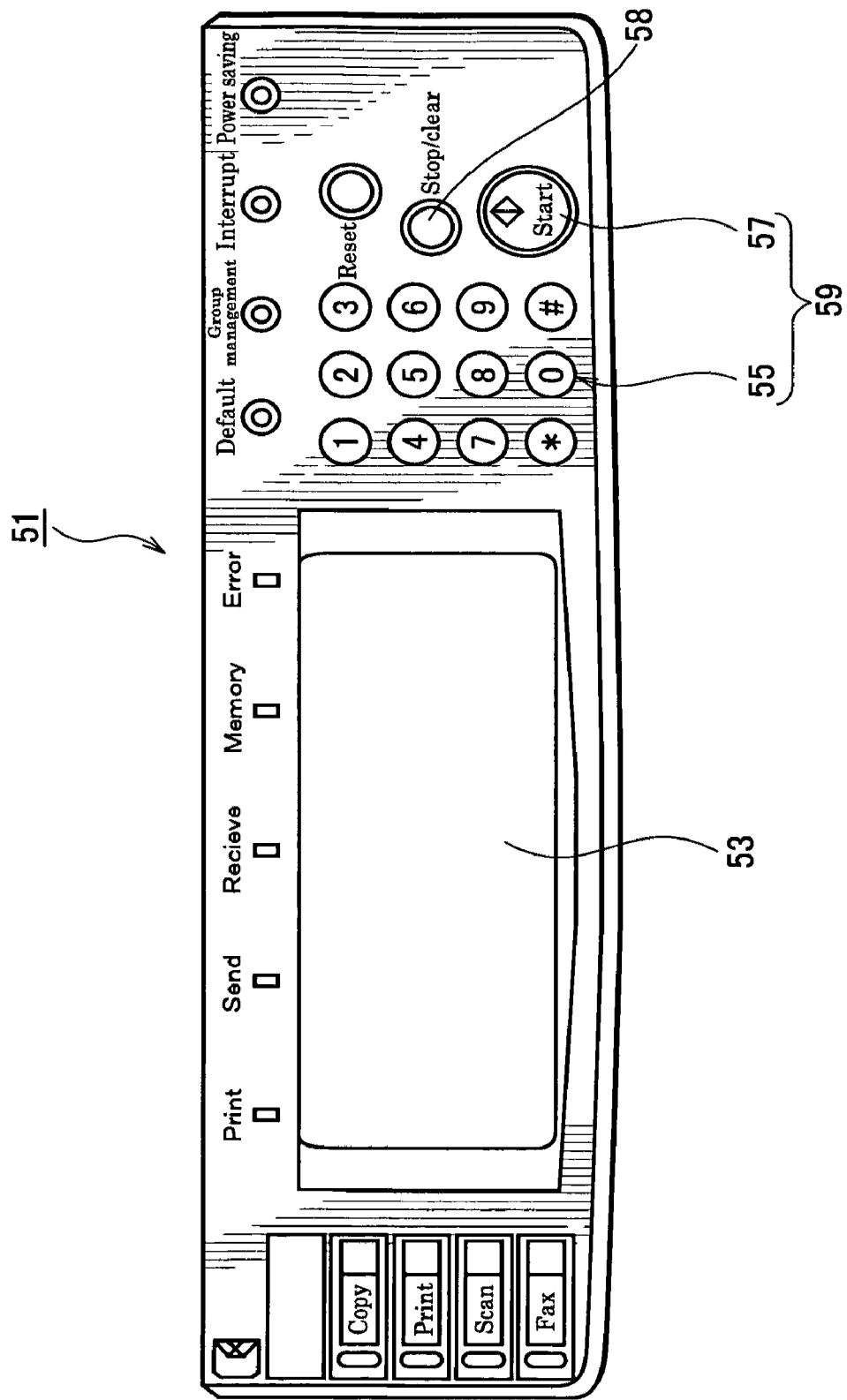
FIG. 2 is an outline view of an operation panel section in common between the image forming apparatuses according to the first and second embodiments of the present invention.

The operation panel section 51 includes a touch panel section 53 and an operation key section 59 arranged with a group of operation keys such as numeric keys 55, a start key 57 and a stop/clear key 58, as shown in FIG. 1 and FIG. 2. The operation panel section 51 is an operation section for selectively inputting various functions in the embodiments. The operation panel section 51 is used in order that a user may conduct an operation related to a scanner function, a facsimile function, a printer function or a copy function. The operation panel section 51 provides the main control section 11 with an operation command, etc., by the user.

The touch panel section 53 includes a touch panel unit combined with a touch panel and a color liquid crystal display (LCD). The touch panel section 53 displays a variety of operation screens, for example, information on a document size, a copy size and the number of copies in performing the copy function and also displays an operation button in order that the user may input a variety of operation commands by touching a relevant place.

The operation key section 59 (corresponding to 'an operation key section' in the present invention) as hardware resources includes a plurality of operation keys to accept an operation input by the user. The operation key section 59 is used when the user selectively conducts a key input operation of a necessary function from among a variety of functions such as a copy function, a printer function, a scanner function and a facsimile function or when the user inputs, for example, the number of copies and a command to execute copying. The operation key section 59 is also used when a user with the intention of having a processing completed in a short time performs an input operation related to execution of an image forming job involving the intention. More specifically, for example, simultaneously pressing the stop/clear key 58 with the start key 57 to command a copy job (image forming job) allows maintenance processing such as a calibration to be invalidated during the performance of the copy job. This operation example is merely an embodiment, and other than the combination described above, combining appropriate key operations can be set as a trigger in order to invalidate the maintenance processing of the calibration. Instead of a group of keys of hardware resources, the operation key section 59 may be configured by what is called a software keyboard which is a group of keys of software resources.

The facsimile communication section 61 includes an encoding/decoding section (not shown), a modulation and demodulation section (not shown) and a network control unit (NCU) (not shown). The facsimile communication section 61 transmits image data of a document which has been read by the scanner section 21, to a facsimile machine via a telephone line and receives image data which has been transmitted by a facsimile machine.

The HDD 63 stores image data which has been read by the scanner section 21 and a variety of data such as an output format set in the image data. The image data stored in the HDD 63 is not only used inside the image forming apparatus but also checked from a client PC, etc., via the network I/F section 65 or transferred to a predetermined folder on a client PC, a file transfer protocol (FTP) server, etc., if necessary.

The network I/F section 65 controls transmission and reception of a variety of data relative to a client PC, etc., connected via the LAN, with use of a network interface (10/100Base-TX). The network I/F section 65, for example, receives printing data having been transmitted from the client PC.

In order to invalidate the maintenance processing such as a calibration correction during execution of a copy job involving a user's intention of having the job completed in a short time when the user with the intention operates the operation key section 59 to perform input operation related to the execution of the copy job, the main control section 11 includes an operation information acquisition section 71 for acquiring operation information related to an input operation of the operation key section 59, a correction start condition table 73 storing predetermined rules as a correction start condition for a calibration, for example, a rule of starting a calibration correction every 1,000 times of copying processing, a correction necessity determining section (corresponding to 'an invalidation determining section' in the present invention) 75 determining the necessity of the calibration correction based on the operation information related to the input operation of the operation key section 59 acquired by the operation information acquisition section 71 and a correction command control section (corresponding to 'an invalidation control section' in the present invention) 77 controlling a command on whether the calibration correction is performed, based on a result of the correction necessity determination in the correction necessity determining section 75.

(Operation of the image forming apparatus of the first embodiment)

Figure 3:
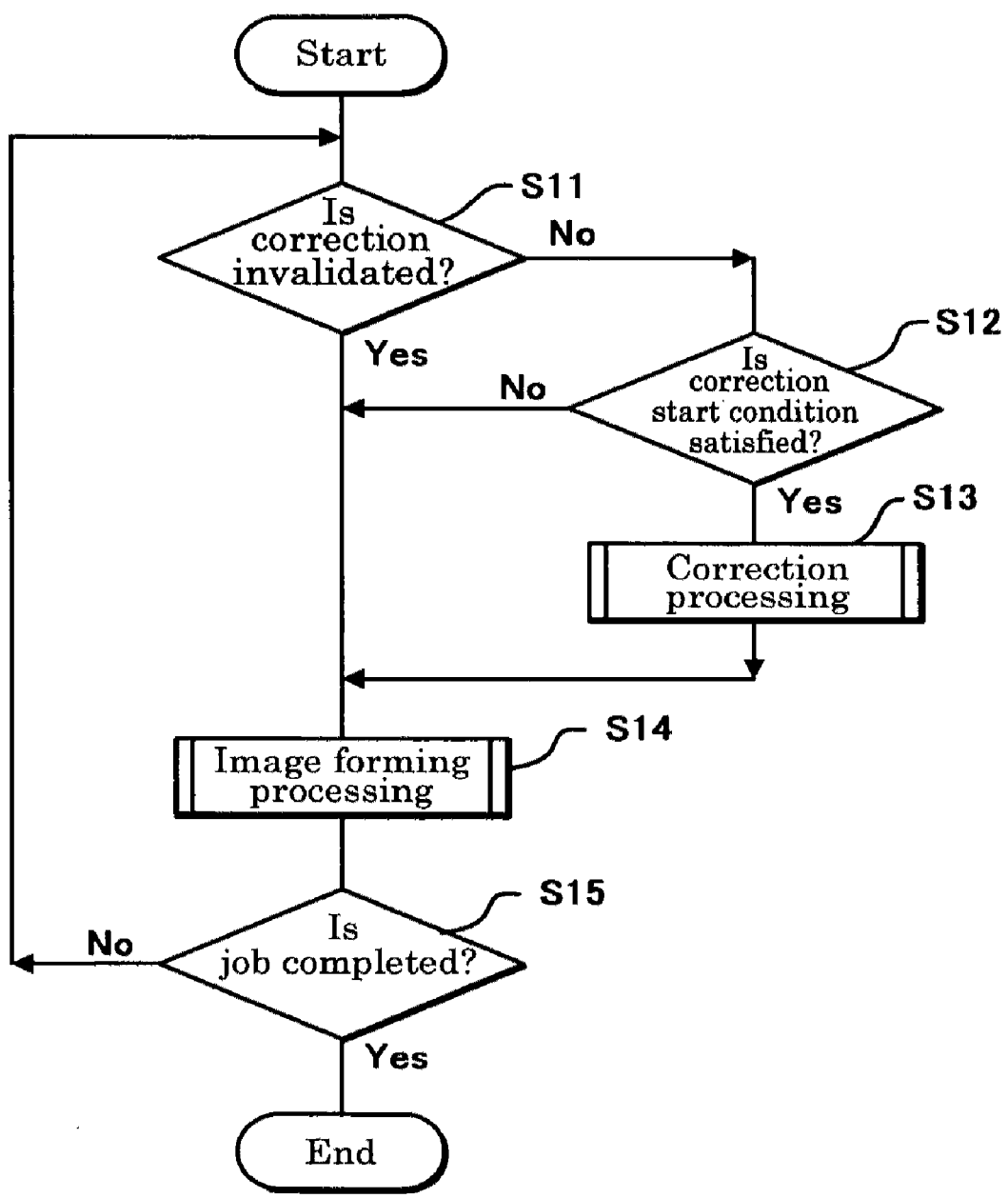
FIG. 3 is an operational flowchart of the image forming apparatus according to the first embodiment of the present invention.

Subsequently, operation of the image forming apparatus according to the first embodiment is described with reference to FIG. 3.

When a user conducts an input operation related to a copy job via the operation key section 59, the operation information acquisition section 71 acquires that operation information and transmits the acquired operation information to the correction necessity determining section 75. In response to that, the correction necessity determining section 75 makes a correction necessity determination on whether a calibration correction is to be invalidated during the performance of the copy job, based on the acquired operation information (step S11). In step S11, a user's intention of the correction necessity is determined through checking whether the input operation by the user is for execution of a copy job involving the user's intention of having the processing completed in a short time, and more specifically, whether the stop/clear key 58 is simultaneously pressed with the start key 57.

When a determination that a correction is needed (a correction does not need to be invalidated) is made, as a result of the correction necessity determination in step S11, the correction necessity determining section 75 refers to the correction start condition, etc., stored in the correction start condition table 73, thereby determining whether the correction start condition is satisfied (step S12). When a determination that the correction start condition has been satisfied is made, as a result of the determination in step S12, the correction command control section 77 commands a correction of calibration, whereupon predetermined correction processing of the calibration is carried out during the copy job (step S13). Although the copy job is interrupted until the correction processing is completed, it is highly probable that image quality is improved after the calibration correction is performed. Therefore, the user can obtain an image with high quality in return for being forced to wait.

When a determination that a correction is not wanted (a correction needs to be invalidated) is made as a result of the correction necessity determination in step S11, when a determination that the correction start condition has not been satisfied is made as a result of the determination in step S12 or after the correction processing in step S13 is ended, the correction command control section 77 provides a command to invalidate the correction of calibration, whereupon a predetermined copy job is performed promptly (step S14).

The main control section 11 determines whether a copy job (making a color copy of 10 sheets of an A4 size document, for example) input by the user is completed each time single copy processing is executed in step S14 (step S15). When a determination that the copy job has not been completed yet is made, as a result of the completion determination in step S15, the main control section 11 returns the flow of the processing to step S11 and repeats the subsequent processing. When a determination that the copy job has been completed is made, as a result of the completion determination in step S15, the main control section 11 terminates the whole processing.

When a user who has initially conducted an operation of selecting not to invalidate the correction reaches the point of intending to invalidate the correction later, switching to a correction invalidation mode can be permitted even during a job by conducting a key operation related to the correction invalidation in the middle of the job.

Figure 4:
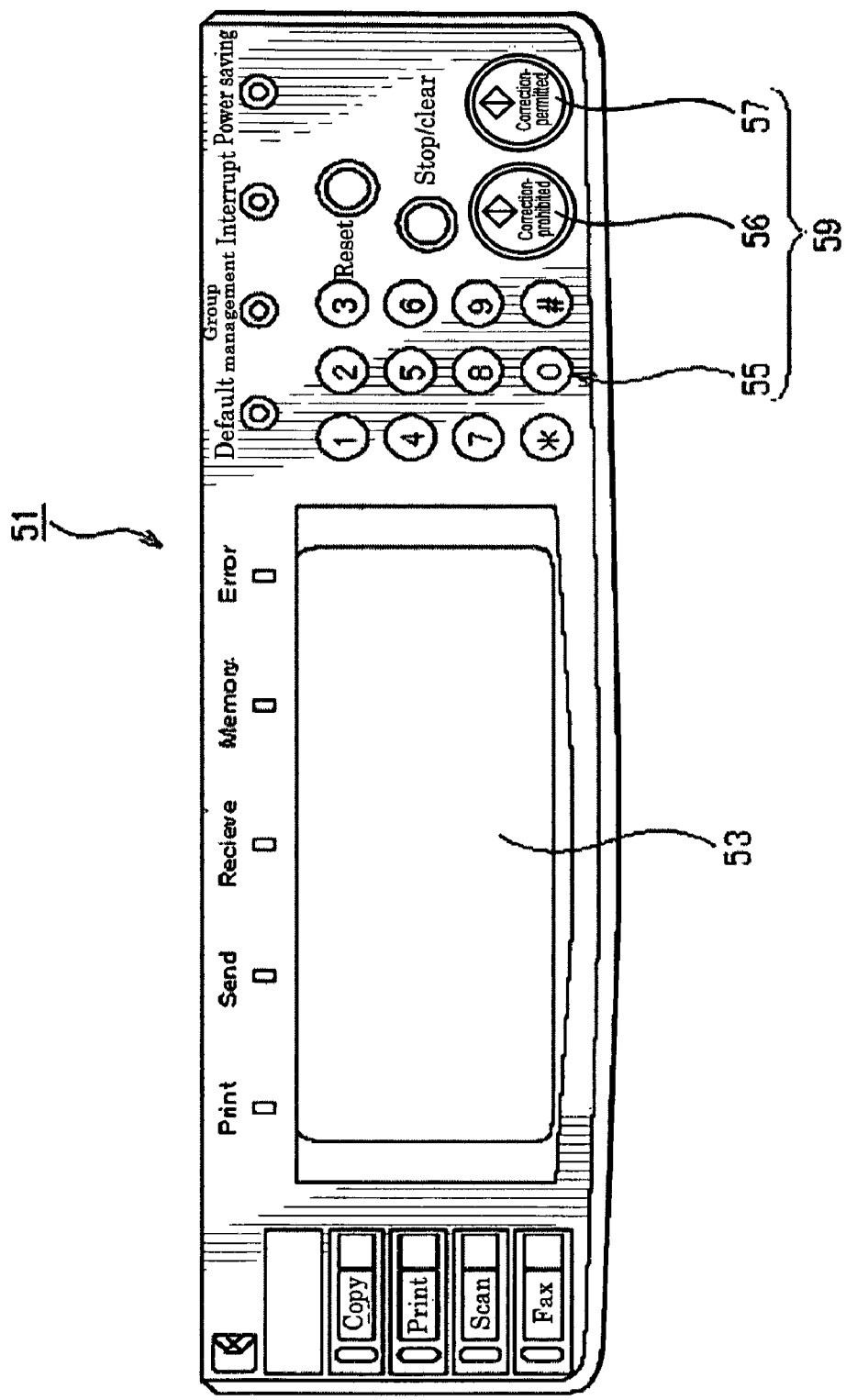
FIG. 4 is an outline view of an operation panel section used in a modification of the image forming apparatus according to the first embodiment of the present invention.

In the first embodiment, a mode of simultaneously pressing the stop/clear key 58 with the start key 57 is exemplarily described as a key operation for the user to input his/her selection of invalidating the correction. However, the present invention is not restricted to the embodiment and can adopt a mode that the user selects a print job with the correction invalidated, by operating an independent dedicated key (see 'a correction-prohibited start key 56' in FIG. 4), for example. By doing this, a user who wants to have a necessary copy job carried out urgently can achieve hid/her purpose easily by pressing the dedicated key with a single keystroke without hesitation. Consequently, convenience for the user can be enhanced.

(Effects of the first embodiment)

According to the image forming apparatus of the first embodiment, as described above, when a user with the intention of having a processing completed in a short time carries out an input operation related to execution of a copy job involving the intention, this operation information is acquired in the operation information acquisition section 71. In response to that, the correction necessity determining section 75 determines to invalidate correction processing of a calibration, based on the operation information. Responding to that, the correction command control section 77 invalidates a calibration correction (processing for maintenance on image forming) during execution of the copy job. As a result, the processing for maintenance on image forming cannot be executed during the copy job with regard to a user with the intention of having the processing completed in a short time, and thus a benefit in line with the user's intention of having a processing completed in a short time can be gained. On the other hand, the processing for maintenance on image forming is executed during the copy job according to predetermined rules with regard to a user having no such intention. Therefore, a benefit of obtaining an image with high quality to which maintenance on image forming is performed as appropriate can be gained. As a result, the conflicting requests from a user that a processing time for image forming is short and that an image with high quality is obtained can both be satisfied.

Figure 5:
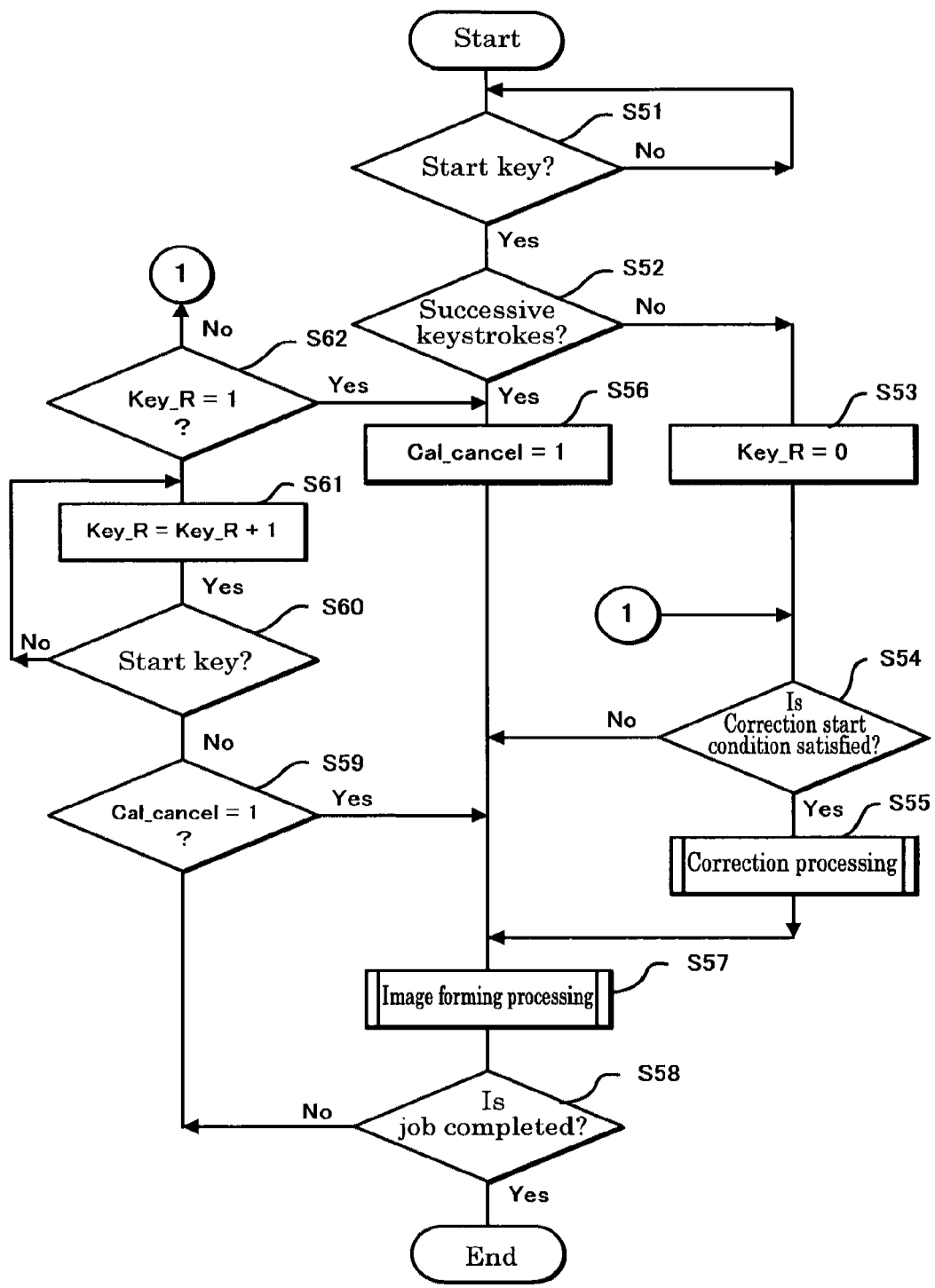
FIG. 5 is an operational flowchart of the image forming apparatus according to the second embodiment of the present invention.

Subsequently, an image forming apparatus according to a second embodiment of the present invention is described in detail with reference to FIGS. 1, 2 and 5.

(Description of components unique to the image forming apparatus of the second embodiment of the present invention)

The image forming apparatus according to the second embodiment of the present invention has a function of invalidating maintenance processing of calibration during execution of a copy job involving a user's intention of having an image forming job completed urgently, when a user with the intention carries out successive input operations of pressing the start key 57.

In order to perform the function, when the start key 57, which is usually operated with one touch to give a command of starting the copy job (image forming job), is input more than once (twice, for example) within a predetermined time (1 second, for example) (a mode of such a key input operation is sometimes referred to as 'a successive keystroke input operation'), the image forming apparatus according to the second embodiment of the present invention serves so as to invalidate maintenance processing of a calibration correction during execution of the copy job, using the successive keystroke input operation as a trigger. However, the operation example is merely an embodiment and a mode of successive keystroke input operations of a key other than the start key 57 can be adopted as a trigger to invalidate the maintenance processing of calibration, etc.

(Operation of the image forming apparatus of the second embodiment)

Subsequently, operation of the image forming apparatus according to the second embodiment is described with reference to FIG. 5.

When an input operation of the start key 57 related to a command to start a copy job is conducted by a user (step S51), the operation information acquisition section 71 acquires that operation information and transmits the acquired operation information to the correction necessity determining section 75. In response to that, the correction necessity determining section 75 makes a successive keystroke determination on whether the start key 57 is successively input more than once (twice, for example) within a predetermined time (1 second, for example), based on the acquired operation information (step S52). In step S52, a user's intention of the correction necessity is determined through checking whether the key input operation by the user is an input operation related to urgent execution of a copy job.

When a determination that the start key 57 has not been input twice successively within one second is made, as a result of the successive keystroke determination in step S52, the correction necessity determining section 75 writes '0' as a default value on a start key flag (Key_R) for storing whether the start key 57 is operated during execution of the copy job (step S53). The value '0' of the start key flag (Key_R) means that the start key 57 is not operated during the performance of the copy job. Next, the correction necessity determining section 75 refers to a correction start condition stored in the correction start condition table 73, thereby determining whether the correction start condition is satisfied (step S54) When a determination that the correction start condition has been satisfied is made, as a result of the determination in step S54, the correction command control section 77 commands a correction of calibration, whereby correction processing according to predetermined rules is carried out during the copy job (step S55). Although the copy job is interrupted until the correction processing is completed, it is highly probable that image quality is improved after the performance of the calibration correction. Therefore, the user can obtain an image with high quality in return for being forced to wait.

When a determination that the start key 57 has been input twice successively within a second is made, as a result of the successive keystroke determination in step S52, the correction necessity determining section 75 regards that the user has selected invalidation of the calibration correction, writes '1' as a default value on a correction invalidation flag (Cal_cancel) for storing whether the calibration correction needs to be invalidated during the performance of the copy job (step S56). The value '1' of the correction invalidation flag (Cal_cancel) means that the calibration correction needs to be invalidated during the performance of the copy job.

After the processing of writing the value of the correction invalidation flag (Cal_cancel) in step S56, when a determination that the correction start condition has not been satisfied is made as a result of the determination in step S54 or after the correction processing in step S55 is ended, the correction command control section 77 commands to invalidate the correction of calibration, whereupon a predetermined copy job is promptly carried out (step S57).

Each time single copy processing is executed in step S57, the main control section 11 determines whether a copy job related to an input operation by a user (making a color copy of 10 sheets of an A4 document, for example) has been completed (step S58). When a determination that the whole copy job has been completed is made, as a result of the completion determination in step S58, the main control section 11 terminates the whole processing.

On the other hand, when a determination that the copy job has not been completed yet is made, as a result of the completion determination in step S58, the correction necessity determining section 75 determines whether the value of the correction invalidation flag (Cal_cancel) is '1' (step S59). When the value of the correction invalidation flag (Cal_cancel) is determined as being '1', as a result of the determination in step S59, the correction necessity determining section 75 returns the flow of the processing to step S57 and repeats the subsequent processing. By this means, in step S56, loop processing is carried out in Steps S57 to S59 after '1' is written as the value of the correction invalidation flag (Cal_cancel), whereupon the copy job is executed rapidly under invalidation of the calibration correction.

On the other hand, when the value of the correction invalidation flag (Cal_cancel) is determined as not being '1', as a result of the determination in step S59, the correction necessity determining section 75 determines whether the start key 57 is input during execution of the copy job (step S60). When a determination that the start key 57 has been input during execution of the copy job is made, as a result of the determination in step S60, the correction necessity determining section 75 increments the value of the start key flag (Key_R) (step S61). Consequently, in step S61, '1' is written as the value of the start key flag (Key_R), when the start key 57 is input during execution of the copy job.

After the processing of writing the value of the start key flag (Key_R) in step S61 or when a determination that the start key 57 has not been input during execution of the copy job is made as a result of the determination in step S60, the correction necessity determining section 75 makes a determination on whether the value of the start key flag (Key_R) is '1' (step S62). When the value of the start key flag (Key_R) is determined as being '1', as a result of the determination in step S62, the correction necessity determining section 75 returns the flow of the processing to step S56 and repeats the subsequent processing. By this means, when the start key 57 is input during the performance of the copy job, '1' is written as the value of the correction invalidation flag (Cal_cancel) in step S56, regarding that invalidation of the calibration correction is selected by the user later. The loop processing in Steps S57 to S59 is carried out after the value of the correction invalidation flag (Cal_cancel) is written, whereupon the copy job is executed rapidly under invalidation of the calibration correction.

On the other hand, when the value of the start key flag (Key_R) is determined as not being '1' as a result of the determination in step S62, the correction necessity determining section 75 returns the flow of the processing to step S54 and repeats the subsequent processing.

(Effects of the second embodiment)

According to the image forming apparatus according to the second embodiment of the present invention, as described above, when a user with the intention of having an image forming job urgently completed inputs the start key 57 more than once within a predetermined time as if to press the key successively, that operation information is acquired by the operation information acquisition section 71. In response to that, the correction necessity determining section 75 makes a determination on whether correction processing of calibration needs to be invalidated, based on the operation information. Responding to that, the correction command control section 77 invalidates the calibration correction (processing for maintenance on image forming) during execution of the copy job. Therefore, even if a user with the intention of having an image forming job urgently completed carries out the successive keystroke input operations of the start key 57 accidentally without being aware that the successive keystroke input operation is a trigger to invalidate the maintenance processing, the correction processing of calibration cannot be performed during the copy job. As a result, a benefit in line with a user's intention of having a copy job completed urgently can be gained regardless of whether the user with the intention knows an operation procedure to invalidate the correction processing of calibration. On the other hand, the correction processing of calibration is performed during the copy job, if necessary, in the case of a user having no such intention. Accordingly, a benefit of obtaining an image with high quality to which maintenance on image forming is performed appropriately can be gained. As a result, the conflicting requests from a user that a processing time of image forming is short and that an image with high quality is obtained can both be satisfied.

(Printer driver, program and recording medium of a third embodiment of the present invention)

Subsequently, a printer driver, a program and a recording medium according to a third embodiment of the present invention are described in detail with reference to FIGS. 6 to 8. Hereinafter, a digital color copier (the image forming apparatuses according to the first and second embodiments) is exemplified as a printer which is an object operation-controlled by the printer driver according to the third embodiment of the present invention. Operation of the digital color copier is described as citing an example of being controlled by a printer driver installed in an information processor 81 such as a personal computer connected to the copier via a network.

(Information processor and its peripheral configuration, installed with the printer driver of the third embodiment of the present invention)

Figure 6:
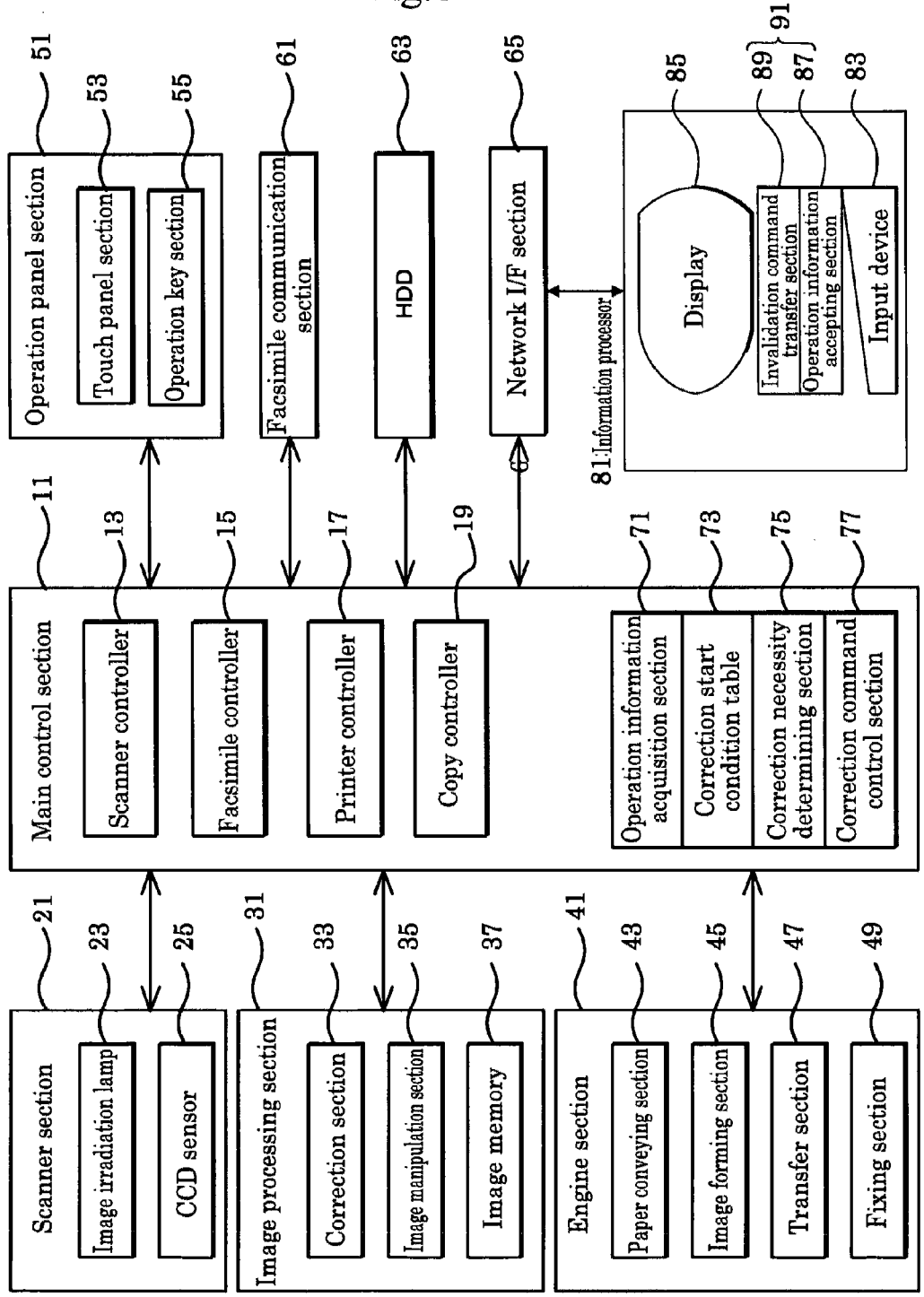
FIG. 6 is a functional block diagram showing a general configuration of an information processor itself and its periphery, installed with a printer driver according to an embodiment of the present invention.

In the third embodiment of the present invention, the network I/F section 65 shown in FIG. 6 controls transmission and reception of a variety of data relative to the information processor 81 such as a client PC connected via the LAN with use of a network interface (10/100Base-TX). The network I/F section 65, for example, receives print data and a print control signal containing a command to invalidate a calibration which have been transmitted from the information processor 81.

The information processor 81 includes an input device 83 including a mouse and a keyboard, a display (corresponding to 'a display' in the present invention) 85 composed of a liquid crystal display panel, etc., for displaying a variety of information, an operation information accepting section (corresponding to 'an operation information accepting section' in the present invention) 87 accepting an input operation related to execution of a print job via the input device 83 and an invalidation command transfer section (corresponding to 'an invalidation command transfer section' in the present invention) 89 transferring to a copier (printer) a command to invalidate correction processing of calibration during execution of a print job involving a user's intention of having the processing completed in a short time when an input operation related to the execution of the print job is accepted via the operation information accepting section 87. The operation information accepting section 87 and the invalidation command transfer section 89 constitute a printer driver 91 according to the third embodiment of the present invention. Maintenance processing such as a calibration correction can be invalidated by installing the printer driver 91 in a predetermined memory area in the information processor 81.

(Linkage operation of the digital color copier and the information processor)

Next, linkage operation of the digital color copier and the information processor is described with reference to FIG. 7 and FIG. 8.

Figure 7:
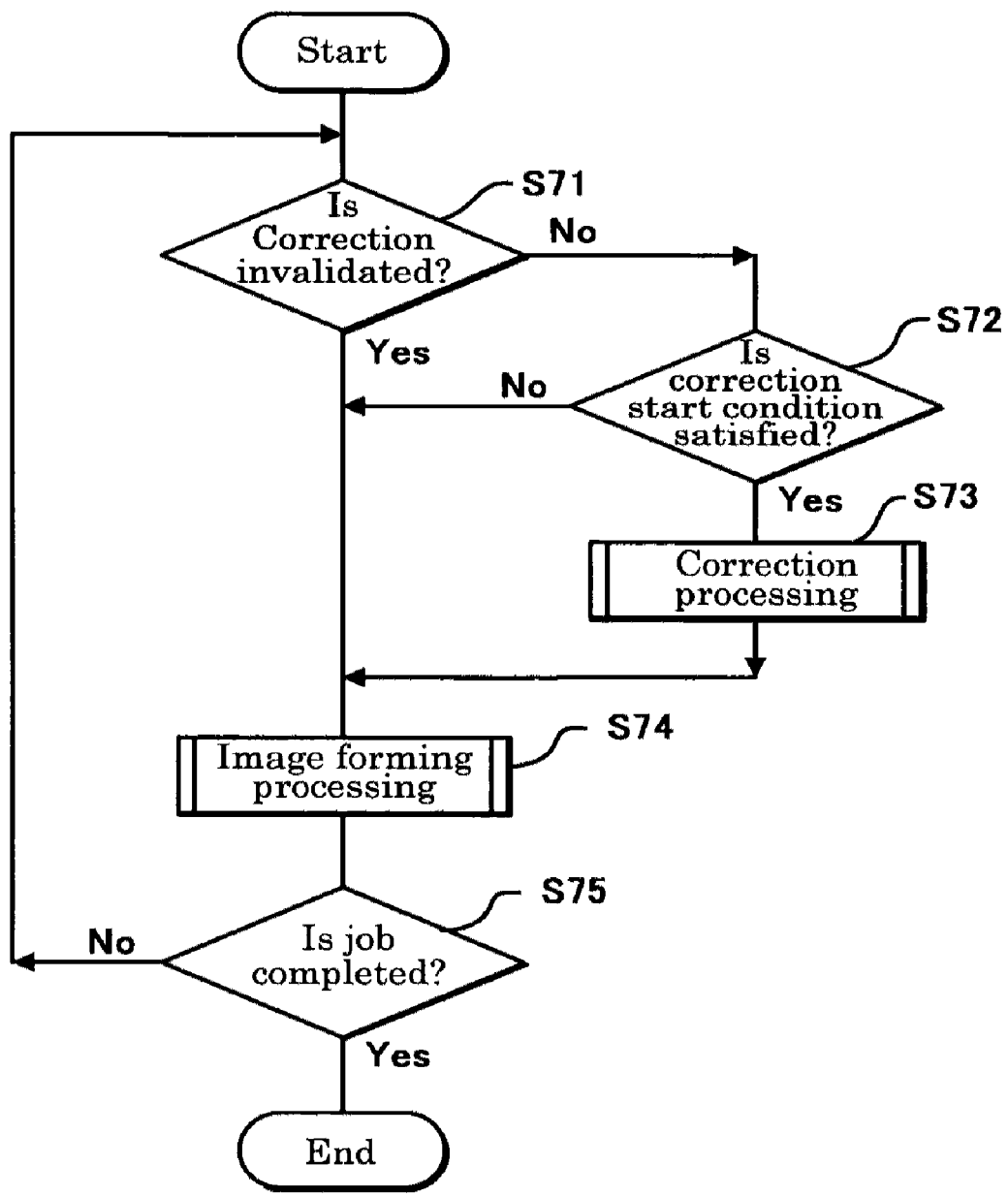
FIG. 7 is a flowchart of a linkage operation between the information processor installed with the printer driver according to the embodiment of the present invention and an image forming apparatus.
Figure 8:
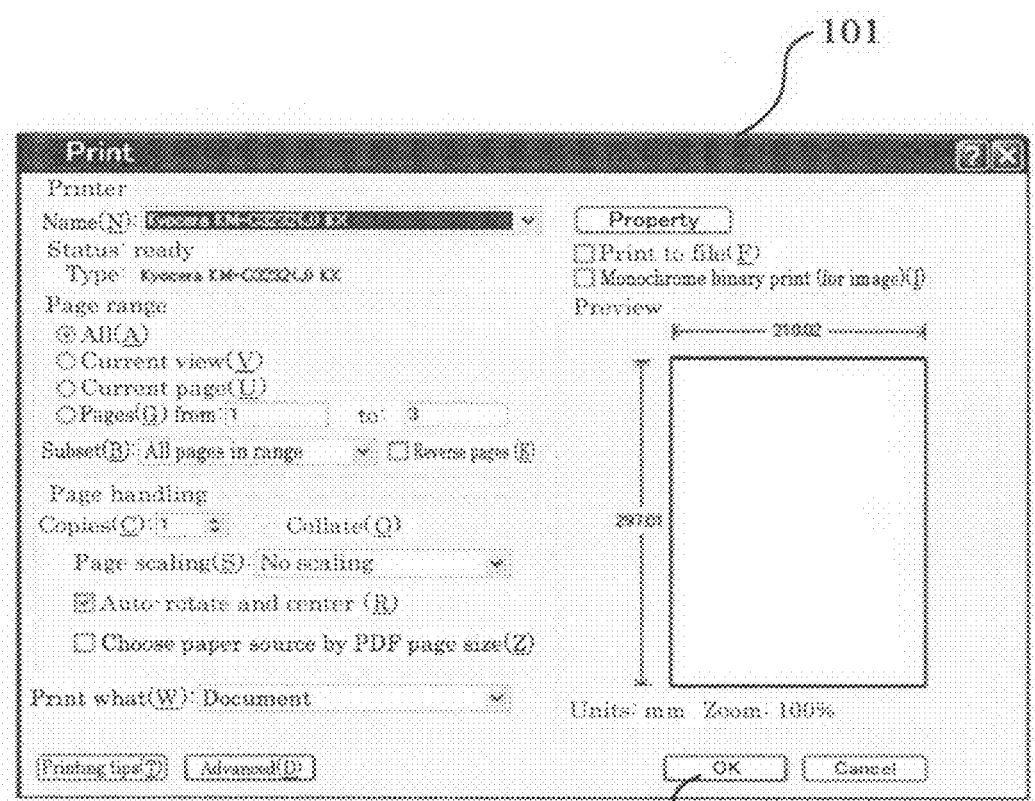
FIG. 8 is a diagram showing an example of a display screen for a print dialogue associated with execution of a print job, displayed on a display in the information processor installed with the printer driver according to the embodiment of the present invention.

When a user carries out an input operation related to a copy job by clicking various kinds of buttons arranged on a print dialogue 101 (see FIG. 8 and FIG. 9), as shown in FIG. 7, the operation information accepting section 87 accepts that operation information and transmits the accepted operation information to the invalidation command transfer section 89. In response to that, the invalidation command transfer section 89 makes the information processor 81 make a correction necessity determination on whether a calibration correction needs to be invalidated during execution of the relevant copy job, based on the acquired operation information (step S71). In step S71, a user's intention of correction necessity is determined through checking whether the input operation by the user is an input operation related to execution of a copy job involving his/her intention of having a processing completed in a short time, and more specifically, whether an 'OK' button 103 on the print dialogue 101 shown in FIG. 8 is double-clicked by the user.

When a determination that a correction is needed (correction does not need to be invalidated) is made, as a result of the correction necessity determination in step S71, the invalidation command transfer section 89 transfers to the copier a command that correction processing of calibration should not be invalidated. In response to that, the main control section 11 refers to a correction start condition stored in the correction start condition table 73, thereby determining whether the correction start condition is satisfied (step S72). As the correction start condition for the calibration, a predetermined condition, for example, starting a calibration correction every 1,000 times of copying, only needs to be set as appropriate. When the correction start condition is determined as having been satisfied, as a result of the determination in step S72, the main control section 11 commands a correction related to calibration, whereby correction processing according to predetermined rules is carried out during the copy job (step S73). Although the copy job is suspended until the correction processing is completed, it is highly probable that image quality is improved after the execution of the calibration correction. Therefore, the user can obtain an image with high quality in return for being forced to wait.

When a determination that a correction is not wanted (a correction needs to be invalidated) is made, as a result of the correction necessity determination in step S71, the invalidation command transfer section 89 transfers an invalidation command to invalidate the calibration correction processing, to the copier. In response to that, the main control section 11 commands to invalidate a correction related to calibration, whereupon a predetermined copy job is executed immediately (step S74). The execution of a copy job in step S74 is conducted in the same manner as the above when a determination that the correction start condition has not been satisfied is made as a result of the determination in step S72 or after the correction processing is ended in step S73.

The main control section 11 makes a determination on whether a copy job (making a color copy of 10 sheets of an A4 document, for example) related to an input operation by a user is completed, each time single copy processing is carried out in step S74 (step S75). When the copy job is determined as not having been completed yet, as a result of the completion determination in step S75, the main control section 11 returns the flow of the processing to step S71 and repeats the subsequent processing. When the copy job is determined as having been completed, as a result of the completion determination in step S75, the main control section 11 terminates the whole processing.

In addition, if a user who has carried out an operation of selecting not to invalidate a correction reaches the point of intending to invalidate the correction later, switching to a correction invalidation mode can be permitted even during the job by double-clicking the 'OK' button 103 related to the correction invalidation.

Figure 9:
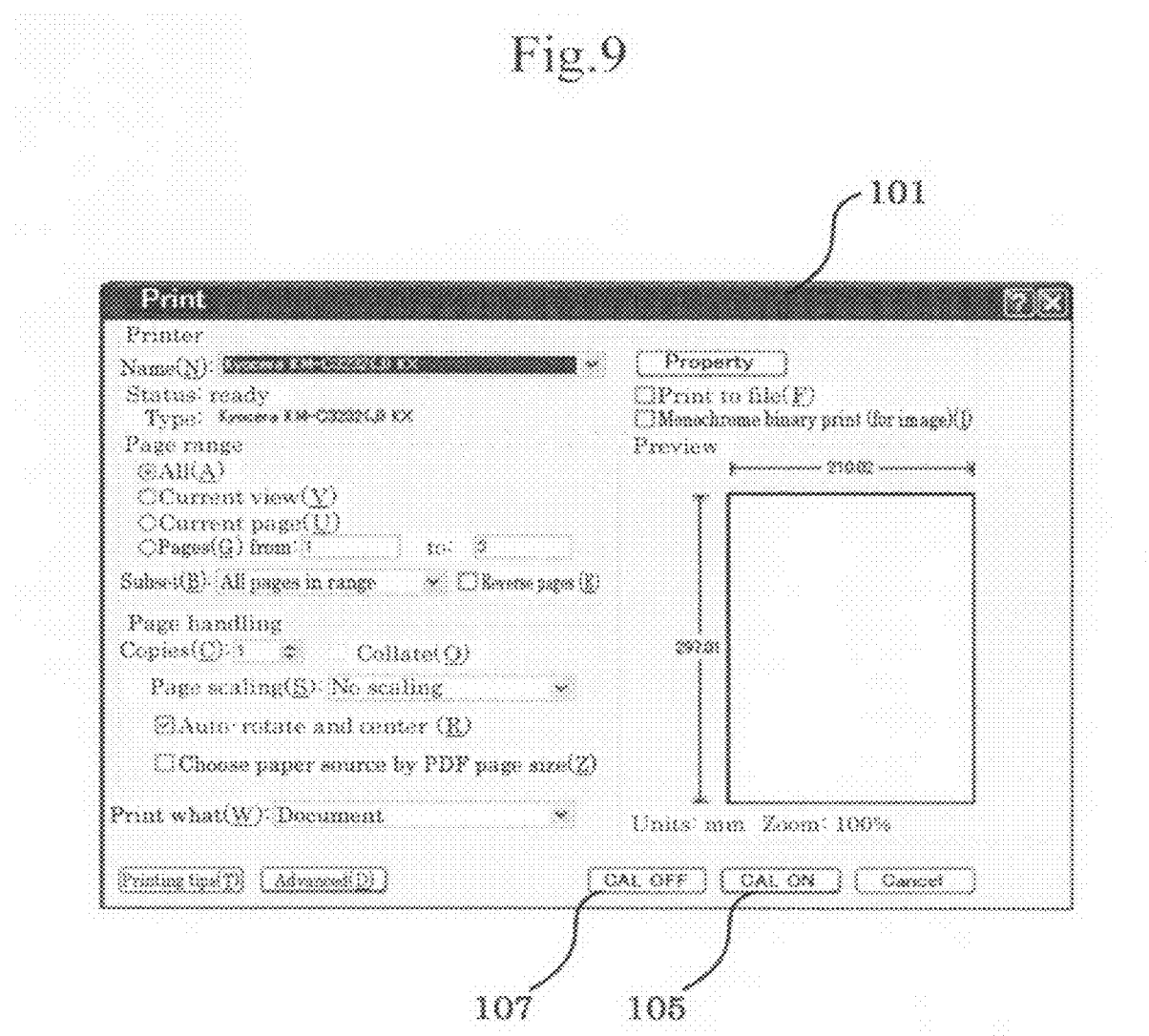
FIG. 9 is a diagram showing a modification of the display screen for the print dialogue associated with the execution of the print job, displayed on the display in the information processor installed with the printer driver according to the embodiment of the present invention.

The mode that a user double-clicks the 'OK' button 103 on the print dialogue 101 as a key operation acting as a trigger to input his/her selection of a correction invalidation is exemplary described in the embodiment of the present invention. However, the present invention is not restricted to the embodiment and can adopt a mode that a 'correction operation on (CAL_ON)' button 105 and a 'correction operation off (CAL_OFF)' button 107 are arranged independently side by side, as shown in FIG. 9, and the user selects a print job involving the correction invalidation by clicking the independent dedicated key (see the 'correction operation off (CAL_OFF) button 107 in FIG. 9) with a single keystroke. By doing that, a user who wants a necessary copy job to be executed urgently can accomplish his/her intention easily by single-clicking the dedicated key without hesitation. Accordingly, convenience for the user can be enhanced.

Furthermore, a concept of the information processor 81 in the third embodiment generally includes a personal computer (PC), a workstation (WS), a personal digital assistant (PDA) and the like, for example.

In addition, the printer driver according to the third embodiment can take an embodiment as a program or a recording medium. More specifically, for example, the printer control function according to the third embodiment may adopt a mode to be performed by a host computer with use of a program installed externally. In that case, even when a group of information including the program is supplied to an output device by a recording medium such as a CD-ROM, a flash memory and a floppy disk or from an external recording medium via a network, the present invention can be applied as it is.

The object of the present invention can also be achieved by supplying a system or a device with a recoding medium storing a program code for software to realize the function in the foregoing embodiment and reading and executing the program code stored on the recording medium by a computer (or a CPU or a MPU) of the system or the device. In this case, the program code itself which has been read out from the recording medium realizes a novel function of the present invention, and the recording medium stored with the program code constitutes the present invention.

As the recording medium for supplying the program code, a flexible disk, a hard disk, an optical disk, a magneto-optical disk, a CD-ROM, a CD-R, a DVD-ROM, a magnetic tape, a nonvolatile memory card, a ROM, an EEPROM and a silicon disk can be used, for example.

In addition to that the function in the aforementioned embodiment is realized by executing the program code which has been read by the computer, a mode that an operating system (OS) operating on the computer performs a part or the whole of actual processing, based on an instruction by the program code so that the processing realizes the function in the aforementioned embodiment also falls within the technical scope of the present invention.

The program code having been read out from the recording medium is written in a memory provided on an extension board inserted into the computer or an extension unit connected to the computer, and then a CPU provided in the extension board or extension unit performs a part or the whole of actual processing, based on an instruction by the program code. A mode of realizing the function in the aforementioned embodiment by this processing also falls within the technical scope of the present invention.

Lastly, it is to be understood that a program composed of software to realize the present invention is downloaded from a server or database on a network with use of a communications program to be read, thereby allowing the system or the device enjoy the function of the present invention.

(Effects of the third embodiment)

With the printer driver according to the third embodiment of the present invention, as described above, when a user with the intention of having a processing completed in a short time carries out an input operation of execution of a copy job involving the intention, the invalidation command transfer section 89 transfers to the copier (printer) an invalidation command to invalidate a calibration correction (processing for maintenance on printing) during execution of the copy job. Therefore, the processing for maintenance on printing cannot be executed during the copy job in the case of the user with the intention of having the processing completed in a short time. By this means, a benefit in line with the user's intention of having a processing completed in a short time is gained. On the other hand, the processing for maintenance on printing according to predetermined rules is executed during the copy job in the case of a user having no such intention. Consequently, a benefit of obtaining an image with high quality to which the maintenance on printing is performed as appropriate is gained. As a result, the conflicting requests from a user that a processing time for printing is short and that an image with high quality is obtained can both be satisfied.

The program according to the third embodiment is configured as a program to realize the function of the printer driver according to the present invention in the information processor. Consequently, an information processor capable of satisfying both the conflicting requests from a user that a processing time for printing is short and that an image with high quality is obtained can be embodied by installing the program according to the present invention in the information processor.

The recording medium according to the third embodiment is configured as a computer-readable recording medium storing the program according to the present invention, which contributes greatly to the spread of a program exhibiting a practical application with superior functions of satisfying both of the conflicting requests from a user that a processing time for printing is short and that an image with high quality is obtained.

(Other)

The present invention is not restricted to the aforementioned embodiments and can be modified as appropriate without departing from the gist or technical idea of the present invention understood from the claims and the specification. An image forming apparatus, a printer driver, a program and a recording medium with such a modification are also to fall within the technical scope of the present invention.

The image forming apparatuses according to the first and second embodiments of the present invention and the printer driver according to the third embodiment of the present invention are configured such that a necessity for correction invalidation is selected each time a user carries out an input operation of a start of a copy job and its setting is not stored. Therefore, execution of a copy job against the user's intention, for example, correction invalidation has been initially set up although the user wants to start the copy job without the correction invalidation, can be avoided.

Finally, in the embodiment of the present invention, the correction processing of calibration for maintaining quality of image forming (printing) is exemplarily described as processing for maintenance on image forming. However, it is to be understood that the present invention is not restricted to the embodiment and can be applied to every processing for maintenance on image forming such as a case of feedback-correcting image output characteristics based on surface potential of a photosensitive drum, for example.

What is claimed is:

1. An image forming apparatus configured to automatically execute processing for maintenance on image forming prior to execution of an image forming job when predetermined rules are satisfied, the apparatus comprising:
   an operation information acquisition section acquiring operation information that is related to execution of an image forming job and that is based on input operation of pressing a start key by a user on the image forming apparatus;
   an invalidation determining section making a determination on whether the maintenance processing needs to be invalidated, based on the operation information acquired by the operation information acquisition section;
   an invalidation control section invalidating the maintenance processing to be automatically executed due to the satisfaction of the predetermined rules during execution of the image forming job, when even though the predetermined rules are satisfied a determination that the maintenance processing needs to be invalidated is made, as a result of the determination in the invalidation determining section;
   an operation key section on the image forming apparatus that comprises a plurality of operation keys including the start key for accepting an operation input by the user,
      the invalidation determining section determining whether to invalidate the maintenance processing when an operation input with the operation key section is carried out after starting execution of the image forming job and during the started execution of the image forming job so that said invalidation occurs during execution of the image forming job.

2. The image forming apparatus according to claim 1, wherein the invalidation determining section determines to invalidate the maintenance processing when the operation information acquisition section acquires operation information that an image forming job involving an intention of having a processing completed in a short time is to be executed.

3. The image forming apparatus according to claim 1, wherein the maintenance processing is processing related to a calibration for maintaining quality of image forming.

4. The image forming apparatus according to claim 1, wherein the operation information related to the execution of the image forming job involving the intention of having a processing completed in a short time is obtained by simultaneously operating more than one key in combination among the plurality of the operation keys.

5. The image forming apparatus according to claim 1, wherein the invalidation determining section determines to invalidate the maintenance processing when the operation information acquisition section acquires operation information that the operation key has been input more than once within a predetermined time.

6. The image forming apparatus according to claim 5, wherein the maintenance processing is processing related to a calibration for maintaining quality of image forming.

7. The image forming apparatus according to claim 5, wherein the operation key is a start key operated at the time of an input instruction for execution of an image forming job.

8. The image forming apparatus according to claim 5, wherein the operation key section is composed of both or either one of groups of keys of hardware resources and software resources.

9. An image forming apparatus, comprising:
a processor that determines that predetermined rules are satisfied, the predetermined rules being a precondition for executing maintenance processing on image forming prior to execution of an image forming job;
an operation information acquisition section acquiring operation information that is related to execution of an image forming job and that is based on input operation of pressing a start key by a user on the image forming apparatus;
an invalidation determining section making a determination on whether the maintenance processing needs to be invalidated, even when the predetermined rules are satisfied, based on the operation information acquired by the operation information acquisition section;
an invalidation control section invalidating the maintenance processing, after the determination is made that the predetermined rules are satisfied, during execution of the image forming job, when the invalidating determining section determines that the maintenance processing needs to be invalidated is made;
an operation key section on the image forming apparatus that comprises a plurality of operation keys including the start key for accepting an operation input by the user,
the invalidation determining section determining whether to invalidate the maintenance processing when an operation input with the operation key section is carried out after starting execution of the image forming job and during the started execution of the image forming job so that said invalidation occurs during execution of the image forming job.

* * * * *